(No Model.)
H. C. STOUFFER.
WHEELBARROW.
No. 597,337. Patented Jan. 11, 1898.
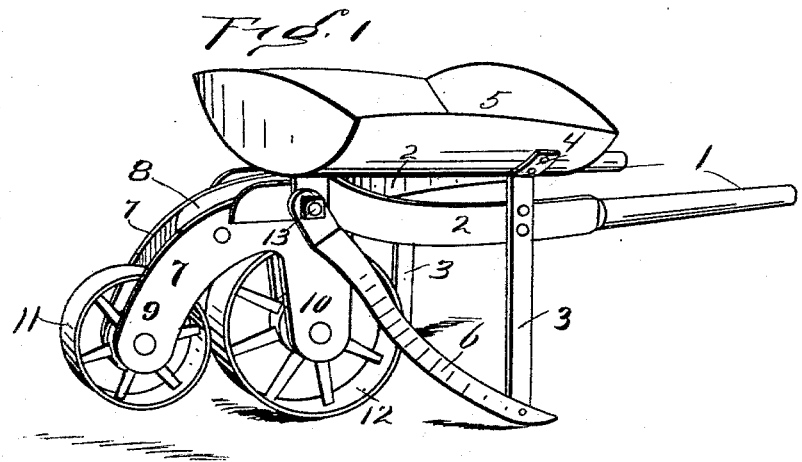
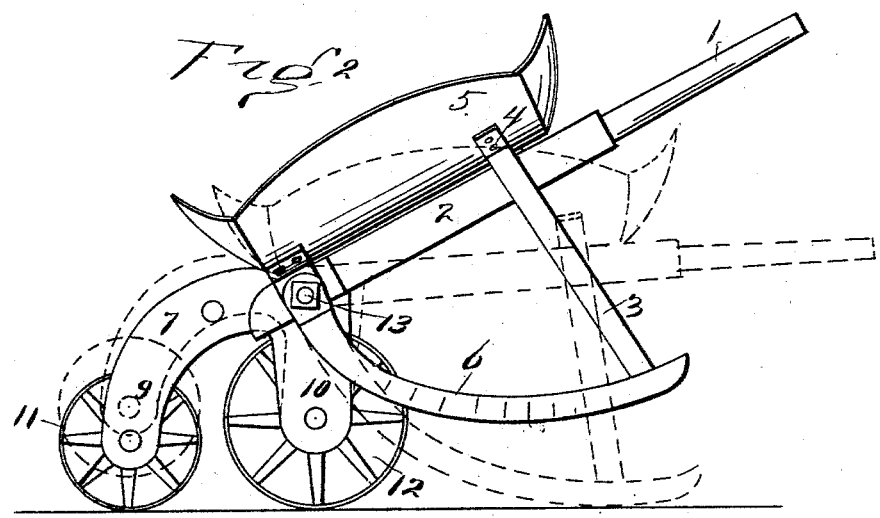
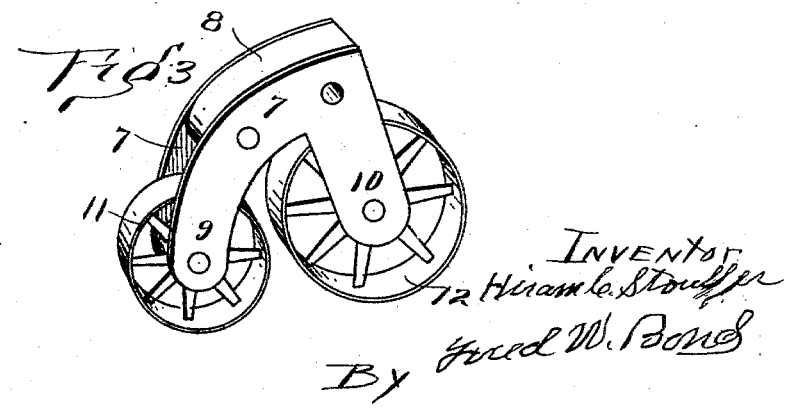
WITNESSES:
C. J. Cross.
B. M. Finch.
INVENTOR
Hiram C. Stouffer
By Fred W. Bond
ATTY.

UNITED STATES PATENT OFFICE.

HIRAM C. STOUFFER, OF TEEGARDEN, OHIO, ASSIGNOR OF ONE-HALF TO CHARLES C. BAKER, OF ALLIANCE, OHIO.

WHEELBARROW.

SPECIFICATION forming part of Letters Patent No. 597,337, dated January 11, 1898.

Application filed September 15, 1897. Serial No. 651,759. (No model.)

*To all whom it may concern:*

Be it known that I, HIRAM C. STOUFFER, a citizen of the United States, residing at Teegarden, in the county of Columbiana and State of Ohio, have invented certain new and useful Improvements in Wheelbarrows; and I do hereby declare that the following is a full, clear, and exact description of the same, reference being had to the annexed drawings, making a part of this specification, and to the figures of reference marked thereon, in which—

Figure 1 is a perspective view of the wheelbarrow. Fig. 2 is a side elevation of the wheelbarrow, showing the body and handles of the wheelbarrow elevated at their rear ends. Fig. 3 is a detached view of the truck.

The present invention has relation to wheelbarrows; and it consists in the different parts and combination of parts hereinafter described, and particularly pointed out in the claims.

Similar numbers of reference indicate corresponding parts in all the figures of the drawings.

In the accompanying drawings, 1 represents the handles, which handles are extended forward to form the bars 2. To the bars 2 are securely attached the legs 3, which legs extend a short distance above the top or upper sides of the bars 2 and are provided with the flanges 4, which flanges are for the purpose of providing a means for attaching the rear end of the wheelbarrow-body 5, which body may be substantially of the form shown, or it may be of any other form; but some kind of a body must necessarily be employed to produce a perfect wheelbarrow. To the front or forward portions of the bars 2 are attached the braces 6, which braces extend downward and rearward and their rear ends connected to the bottom or lower ends of the legs 3. The front or forward portions of the bars 2 are bent or curved toward each other, and are so formed for the purpose of bringing the bars 2 near each other at their front or forward ends, as illustrated in Fig. 1.

The truck proper consists of the side members 7, which side members are securely connected together by means of the block 8, which block is securely fastened between the members 7 by suitable rivets or in any other well-known manner. The side members 7 are each provided with the downwardly-projecting arms 9 and 10. The arms 9 are extended forward, substantially as illustrated in the drawings, and to their bottom or lower ends is journaled the wheel 11. To the arms 10 is journaled the wheel 12, said wheel 12 being directly behind the wheel 11, and is so located that it will come partially under the body 5, so that it will carry the greater part of the load contained in the body 5. The arms 9 and 10 upon each of the members 7 are formed integral with each other, or are preferably so formed that the truck will be rigid within itself and form a strong support for the front or forward end of the wheelbarrow proper. The side members 7 are pivotally connected to the bars 2 by means of the cross-bolt 13 or its equivalent, so that said side members will be free to turn or oscillate upon the cross-bolt 13, as hereinafter described.

It will be understood that by my peculiar arrangement I am enabled to remove the weight of the load from the arms of the operator and transfer the weight to the wheel 12. The wheel 11 is located in front of the wheel 12 and is so located for the purpose of receiving a portion of the weight of the load and at the same time prevent the wheelbarrow 5 from tilting forward, except when it is desired to do so.

It will be seen that when the handles 1 are elevated the front or forward wheel 11, together with the arms 9, will be pressed downward, thereby distributing the weight between the wheels 11 and 12; but by the location of the wheel 12 the greater portion of the load will be carried by said wheel 12. For the purpose of providing a wheelbarrow that will be easily operated the wheel 12 is formed larger in diameter than the wheel 11, so that the load can be pushed forward with greater ease.

It will be understood that the block 8 should be so arranged that its top or upper face, together with the top or upper edges of the members 7, will come a short distance below the top or upper edges of the bars 2, so that said truck will be free to oscillate for a short distance upon the cross-bolt 13, or, in other words, when the handles 1 are elevated the block 8 will strike against the bottom or under side of the body 5, after which as much weight can be thrown onto the front or forward wheel 11 as is desired, or, if desired, the entire weight of the load may be carried by the wheel 12.

Having fully described my invention, what I claim as new, and desire to secure by Letters Patent, is—

1. In a wheelbarrow, a frame carrying a body, a pivoted truck having journaled thereto the wheels 11, and 12, one located in front of the other, substantially as and for the purpose specified.

2. The combination of the handles 1, the bars 2, the truck consisting of the side members 7, and the downwardly-extended arms 9, and 10, having journaled to their bottom or lower ends the wheels 11, and 12, substantially as and for the purpose specified.

3. As an improved article of manufacture, a wheelbarrow-frame carrying a body, a truck connected to the frame, a wheel located partially under the frame and body, and the wheel 11, located in front of and in line with the wheel 12, substantially as and for the purpose specified.

In testimony that I claim the above I have hereunto subscribed my name in the presence of two witnesses.

HIRAM C. STOUFFER.

Witnesses:
F. W. BOND,
B. M. FINCH.